(12) United States Patent
DeFrank

(10) Patent No.: US 7,362,000 B1
(45) Date of Patent: Apr. 22, 2008

(54) FLUID PULSATING GENERATOR

(76) Inventor: Michael DeFrank, 19472 Farallon Rd., Madera, CA (US) 93638

( * ) Notice: Subject to any disclaimer, the term of this patent is extended or adjusted under 35 U.S.C. 154(b) by 0 days.

(21) Appl. No.: 11/603,599

(22) Filed: Nov. 22, 2006

(51) Int. Cl.
*H02P 9/04* (2006.01)
(52) U.S. Cl. .................................... 290/1 R
(58) Field of Classification Search ................ 290/1 R
See application file for complete search history.

(56) References Cited

U.S. PATENT DOCUMENTS

| 3,500,451 | A | * | 3/1970 | Yando | 310/330 |
| 3,558,936 | A | * | 1/1971 | Horan | 310/323.01 |
| 3,970,877 | A | * | 7/1976 | Russell et al. | 310/339 |
| 4,669,068 | A | * | 5/1987 | Klatt | 367/83 |
| 5,601,381 | A | | 2/1997 | Hader et al. | |
| 5,727,733 | A | | 3/1998 | Ruttenberg | |
| 5,839,508 | A | * | 11/1998 | Tubel et al. | 166/65.1 |
| 6,011,346 | A | * | 1/2000 | Buchanan et al. | 310/339 |
| 6,504,258 | B2 | * | 1/2003 | Schultz et al. | 290/1 R |
| 6,768,214 | B2 | * | 7/2004 | Schultz et al. | 290/1 R |
| 7,234,519 | B2 | * | 6/2007 | Fripp et al. | 166/250.01 |
| 2001/0040379 | A1 | * | 11/2001 | Schultz et al. | 290/1 R |
| 2005/0000277 | A1 | * | 1/2005 | Giles | 73/120 |
| 2007/0188046 | A1 | * | 8/2007 | Chaillout et al. | 310/311 |

OTHER PUBLICATIONS

NIBCO Irrigation Systems, Pulsator.
Advanced Cerametrics Inc., Piezoelectric Ceramic Fibers.

* cited by examiner

*Primary Examiner*—Joseph Waks
(74) *Attorney, Agent, or Firm*—Fulwider Patton LLP

(57) ABSTRACT

A fluid pulsating generator utilizes a repeating pulsating component in conjunction with one or more piezoelectric members to generate a piezoelectric affect which creates an electrical voltage. The fluid pulsating generator can be incorporated into a pulsating sprinkler device which produces a continuous pulsating motion which causes the piezoelectric members to deform to generate the piezoelectric effect that produces the electrical voltage.

12 Claims, 2 Drawing Sheets

FLUID PULSATING GENERATOR

BACKGROUND OF THE INVENTION

The present invention relates generally to fluid devices used to convert a steady fluid flow to an intermittent pulsating flow, and more particularly, to a fluid pulsating generator which utilizes intermittent pulsating fluid flow to generate electricity. Some applications of the present invention include pulsating irrigation devices such as sprinklers, misters and drippers used for irrigation purposes. While the present invention is particularly suitable for use with irrigation systems, the fluid pulsation generator of the present invention can be utilized many other fluid-driven devices which produce a pulsating fluid flow that can harvested into electrical energy.

The use of irrigation devices, or other fluid devices or appliances, to generate electricity is well known. Such devices often include an impeller positioned within the device, such as within a hose, pipe or other housing, which is rotated as the fluid, such as water, flows past the impeller. The impeller is often coupled to the rotor portion of a generator such that the rotor of the generator turns as the fluid flows past and turns the impeller. However, often, the use of an impeller-driven generator expends some of the force of the fluid, thereby reducing fluid pressure down stream from the impeller. In the case of an irrigation sprinkler system, such reduction in fluid pressure can reduce the fluid distribution area of the sprinkler.

Other devices known in the art to generate and harvest electrical energy utilizes the physical phenomenon known as piezoelectricity. Certain materials, such as particular crystals, have physical properties which allow the material to generate a voltage (electricity) in response to an applied mechanical stress or "deformation" to the material. This ability of the material to generate such a voltage is referred to piezoelectricity or the "piezoelectric effect." Generally, the word piezo is derived from the Greek word piezein, which means to squeeze or press. This piezoelectric effect is also reversible in that piezoelectric crystals, when subjected to an externally applied voltage, can change shape by a small amount. As such, piezoelectric elements find useful applications in many products such as in the production and detection of sound, the generation of low to high voltages, electronic frequency generation, microbalance and ultra fine focusing of optical assemblies, to name just a few applications.

Piezoelectric elements have been utilized in a number of different devices for developing an energy harvesting system that recovers what would otherwise be wasted mechanical energy. Such piezoelectric elements can convert mechanical energy from a number of sources into useful electrical energy which can be stored and/or used to charge other electrical devices. Electric circuitry has been developed which can be connected to the piezoelectric element for developing and storing the generated output voltage from the piezoelectric element.

What has been needed is a fluid pulsating generator which can use otherwise wasted mechanical energy developed by a fluid pulsating device, such as a sprinkler, to generate and store electrical energy. Such a generator should not adversely affect the performance of fluid pulsating device and should be easily incorporated into such a device. The present invention satisfies these and other needs.

SUMMARY OF THE INVENTION

The present invention is directed to a fluid pulsating generator which converts otherwise wasted mechanical energy by converting it into useful electrical energy which can be stored and/or used to charge other electronic devices. The present invention utilizes such a fluid pulsating generator in conjunction with fluid pulsating devices which use or create an intermittent pulsating flow of fluid during use. The invention utilizes one or more piezoelectric elements in conjunction with a fluid pulsating device to create the electricity to be harvested. The present invention utilizes the repetitive motion created in the fluid pulsating device to deform (i.e., apply a mechanical stress or force) the piezoelectric element in order to produce the piezoelectric effect which generates electrical voltage in response to the applied mechanical stress or force.

In one embodiment of the invention, the fluid pulsating generator includes an actuating mechanism used to create the pulsating fluid flow within the device. A fluid inlet associated with the actuating mechanism supply the fluid which develops the repetitive motion of the device. In turn, a piezoelectric element is associated with the actuating mechanism such that when the actuating mechanism develops the repetitive motion, that repetitive motion is used and directed onto the piezoelectric element to generate the electric voltage. The repetitive motion created by the actuating device can take on various forms, such as a repetitive motion that creates a repeating tensioning force which acts on the piezoelectric component to deform it and achieve the piezoelectric effect. In one particular aspect of the invention, the piezoelectric element or component actually forms one of the components of the actuating mechanism. In another aspect, the piezoelectric element can be attached to the actuating mechanism. It should be appreciated that one or more piezoelectric elements can be associated with the actuating mechanism such that as the actuating mechanism develops the repetitive motion or force, that motion or force is applied to the various piezoelectric elements to generate electrical energy.

In another aspect of the present invention, the piezoelectric element is associated with the actuating mechanism which creates a repeating pulsating force which strikes the piezoelectric element to generate the electrical voltage. In this aspect of the invention, an intermittent pulsating force is created by the actuating mechanism which impinges on the piezoelectric element to generate the voltage. In another aspect of the invention, the piezoelectric element can be attached to or can be formed as a part of the actuating mechanism and is adapted to contact a structure which deforms or provides the applied mechanical stress to the piezoelectrical element to generate electricity. In another aspect, the piezoelectric element can be placed in near or in close proximity to the actuating mechanism such that the actuating mechanism will contact or strike the piezoelectric element as it progresses through its repetitive pulsating motion. Again, the striking of the piezoelectric element causes the piezoelectric element to undergo the effect which creates or generates the electrical voltage.

In another aspect of the present invention, the present invention is incorporated in an irrigation device, such as a sprinkle, which can be utilized for irrigation purposes. In this particular aspect of the invention, the irrigation pulsator generator includes a housing having a water inlet which feed an inflatable bladder adapted to receive the flow of water. The inflatable bladder is design to fill with water and expand in order to release a burst of pressurized water to a water dispersing component such as a jet or spinner. One or more piezoelectric elements can be associated with the inflatable bladder such that the expansion and the contraction of the inflatable bladder will deform the piezoelectric elements to generate the electrical voltage. In this aspect of the present invention, the inflatable bladder acts as the actuating mechanism since the inflatable bladder will repetitively expand and contract during its inflation and discharge cycles. The bladder produces an intermittent and pulsating water flow which is dispersed to the area surrounding the device for irrigation purposes while allowing the expansion and contraction of the bladder to be used to deform, i.e., apply the mechanical stress, to the piezoelectric elements to generate electrical energy. In one aspect of the present invention, the piezoelectric element undergoes a repeating tensioning force applied by the expansion and contraction of the inflatable bladder. Alternatively, the piezoelectric element can be placed on the inflatable bladder in such a manner that as the bladder inflates and deflates, the piezoelectric element will strike a structure, such as the housing, to create the applied mechanical stress to the piezoelectric element.

Other features and advantages of the present invention will become more apparent from the following detailed description of the invention, when taken in conjunction with the accompanying exemplary drawings.

DETAILED DESCRIPTION OF THE PREFERRED EMBODIMENTS

Although the above description of the present invention describes a particular configuration, the invention is not limited to such configuration. Other modifications and improvements may be made without departing from the scope of the invention.

Figures 1, 2:
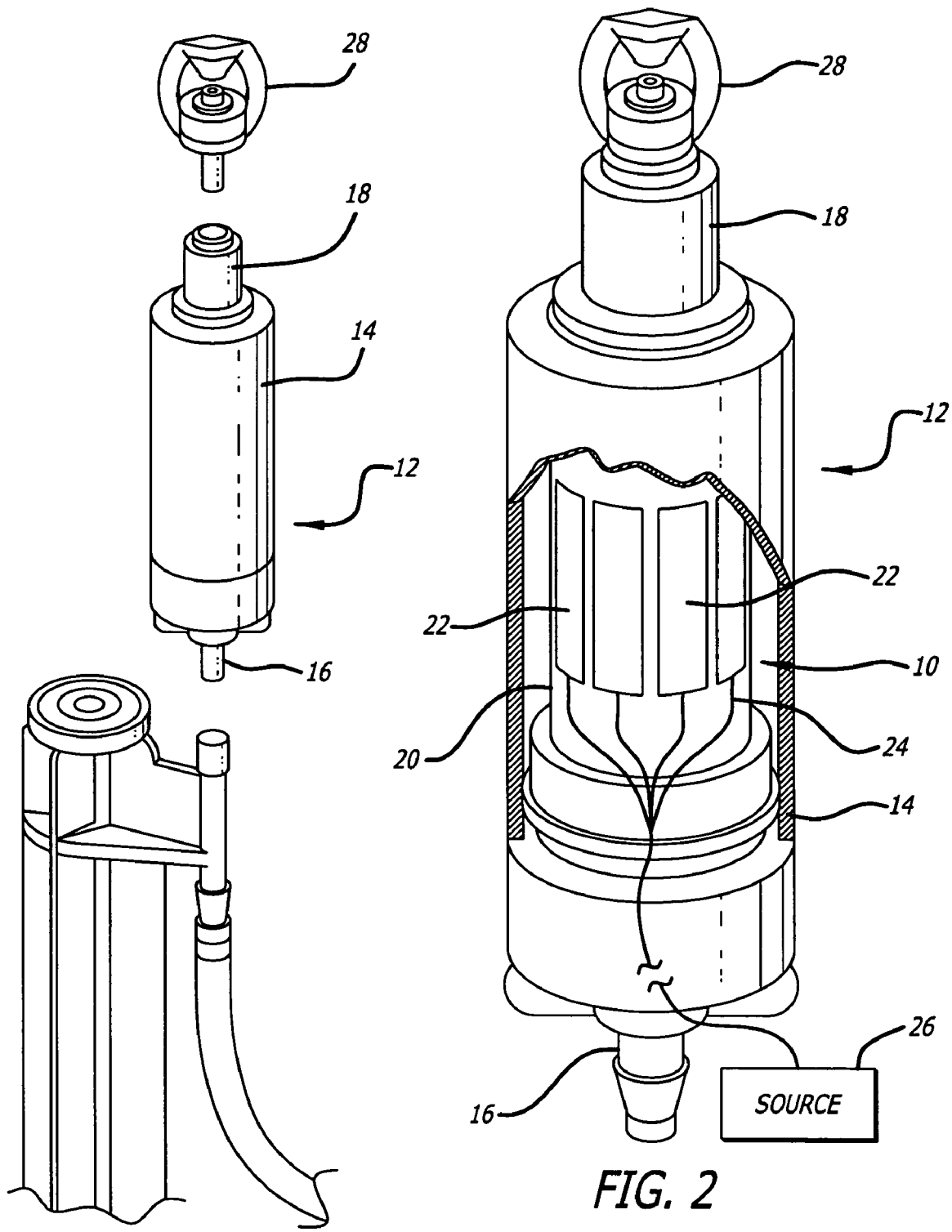
FIG. 1 is a perspective view of an embodiment of an irrigation device which incorporates the fluid pulsating generator of the present invention.
FIG. 2 is a perspective view the irrigation device of FIG. 1, partially in section, which shows one embodiment of a fluid pulsating generator of the present invention.

FIGS. 1 and 2 show a fluid pulsating generator 10 made in accordance with the present invention which is embodied as an irrigation sprinkler device 12 used to convert a low water flow to a high intermittent pulsating flow for irrigating plants, trees and the like. Such an irrigation sprinkler device 12 is sold under the trademark PULSATOR by Nibco Irrigation Systems of Fresno, Calif. The sprinkler device 12 includes an outer housing 14 which holds the various components making up the sprinkler device. A fluid inlet 16 allows the fluid source, such as water, to enter the housing and to be released through a fluid outlet 18 located near the top of the housing 14. An inflatable bladder 20 is in fluid communications with the fluid inlet 16 and the fluid outlet 18 and is adapted to expand and contract in a repetitive motion, i.e. a pulsating motion, when fluid enters into the fluid inlet opening 16. The sprinkler device 12 includes components associated with the inflatable bladder 20 which allow the bladder to expand and contract in a pulsating fashion. Other suitable irrigation sprinkler devices which can be associated with the fluid pulsating generator of the present invention include, but are not limited to, pulsating sprinklers described in U.S. Pat. Nos. 5,601,381 and 5,727,733, whose contents are incorporated in their entirety herein.

A number of piezoelectric elements or components 22 are shown in FIG. 2 attached to the outer surface of this inflatable bladder 20. As is shown in FIG. 2, each of the piezoelectric components 22 are connected by electrical wires 24 to a source 26 which is adapted to store or otherwise utilize the electrical voltage being generated by the piezoelectric components. In operation, these piezoelectric components 22 are adapted to undergo a deformation, i.e. a strain, which creates a small electric current that is generated and delivered to the source 26. The deformation to the piezoelectric components can be achieved by a number of different ways in order to achieve the piezoelectric effect that produces the electrical voltage. For example, the piezoelectric components can be repetitively stretched by a repeating expanding and contracting force acting on the component. Other ways of generating the piezoelectric effect is to repetitively strike the piezoelectric component with a repetitive force or have the piezoelectric component repetitively strike an object. These are just a few of the ways to generate the piezoelectric effect.

Figure 3:
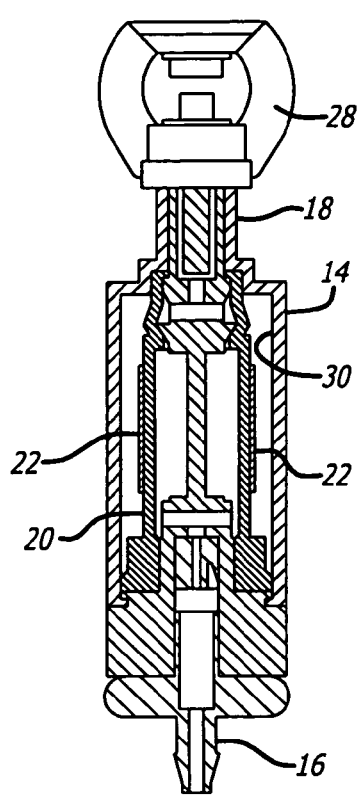
FIG. 3 is a cross-sectional side view of the irrigation device and fluid pulsating generator of FIG. 2 in a neutral, unexpanded position prior to entry of water within the inflatable bladder which forms part of the irrigation device.
Figure 4:
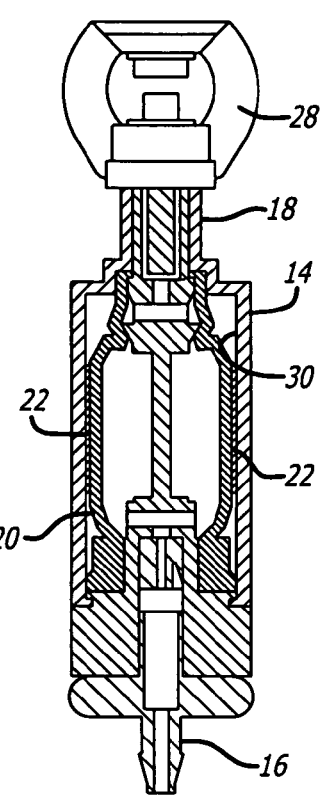
FIG. 4 is a cross-sectional side view of the irrigation device and fluid pulsating generator as a constant flow of water enters the inflation bladder.
Figure 5:
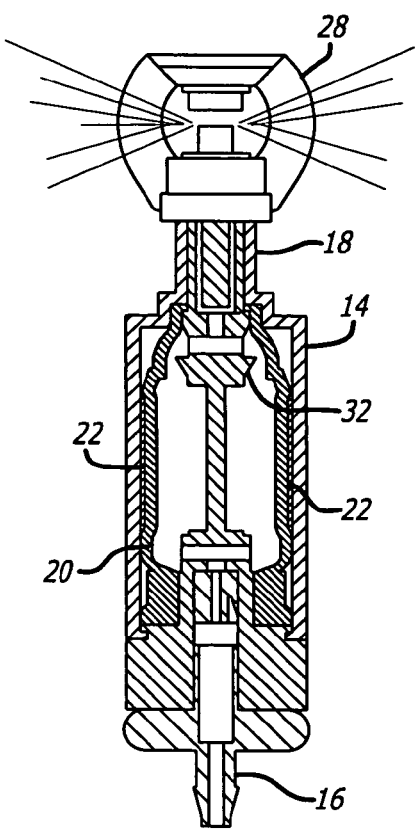
FIG. 5 is a cross-sectional side view of the irrigation device and fluid pulsating generator as the inflation bladder is expanded by the water pressure to a point when a discharge seal opens releasing a burst of pressurized water to the water dispersing component.

Turning now to FIGS. 3-5, a sequence of the expansion and contraction of the inflatable bladder 20 is shown which causes the piezoelectric elements 22 to undergo the deformation which generates the electrical energy. First, as can be seen in FIG. 3, the inflatable bladder 20 is shown in a contracted position with the piezoelectric members 22 placed on the outside of the bladder. FIG. 4 shows the expansion of the bladder 20 caused by the input of water through the fluid inlet 16. In this manner, the piezoelectric members 22 are stretched and deformed in order to produce the piezoelectric effect which results in the generation of an electrical voltage. FIG. 5 shows the top seal 32 of the inflatable bladder 20 opening in response to the increase of water pressure within the bladder which causes the water to be discharged through the sprinkler head 28 attached to the fluid outlet 18. After the water has been discharged from the inflatable bladder, the bladder resumes its unexpanded position as is shown in FIG. 3 and the cycle of inflation and deflation of the bladder repeats. In this manner, the sprinkler device 12 continuously creates an expansion and contraction of the inflatable bladder 20 which, in turn, causes the repetitive deformation of the piezoelectric components associated with it to generate the electrical voltage. In this manner, the fluid pulsating generator made in accordance with the present invention will generate electrical voltage during the time when the sprinkler device is being used for irrigation purposes.

Figure 6:
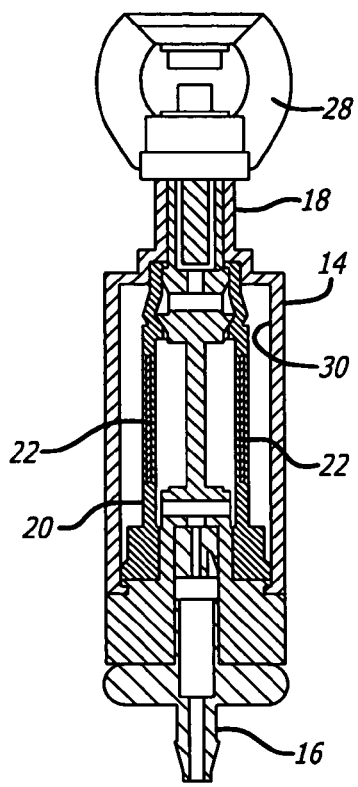
FIG. 6 is a cross-sectional side view of another embodiment of an irrigation device and fluid pulsating generator incorporation features of the present invention.

FIG. 6 shows another embodiment in the present invention in which the piezoelectric components are formed as part of the inflatable bladder 20. In this regard, there would be no need to affix piezoelectric components to the outside surface of the bladder since the components actually form part of the bladder. The piezoelectric affect is achieved in the same manner by expanding and contracting the inflatable bladder 20 and piezoelectric components through the pulsating fluid which enters and discharges from the sprinkler device.

Figure 7:
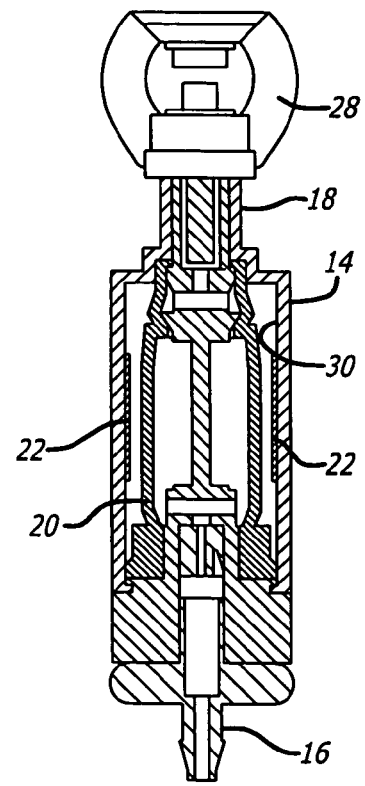
FIG. 7 is a cross-sectional side view of still another embodiment of an irrigation device and fluid pulsating generator incorporation features of the present invention.

FIG. 7 shows yet another embodiment of the present invention in which the piezoelectric components 22 are not attached to the inflatable bladder, but rather, are attached to the inner surface 30 of the housing 14 of the sprinkler device. As mentioned above, the piezoelectric affect can also be achieved by applying a force onto the piezoelectric component. In this particular embodiment of the invention, the inflatable bladder 20 is designed to strike the piezoelectric components 22 located on the housing in order to the piezoelectric affect. This is just one of a number different ways in which the piezoelectric affect can be achieved by utilizing a piezoelectric component in conjunction with a component which developed a continuous repeating motion which produces a force on the piezoelectric members. It should also be appreciated that the piezoelectric components can be either struck by an object or can strike an object to create the piezoelectric effect. In this regard, the piezoelectric components could be attached to the bladder and designed to strike the wall of the housing, as is shown in FIGS. 3-5, to achieve the piezoelectric effect.

The piezoelectric components 22 which can be utilized in accordance with the present invention can be made from any one of a number of different commercially available piezoelectric materials. For example, the piezoelectric component could be a piezoelectric membrane strip which, as is shown in FIGS. 3-5, is applied to the surface of the inflatable bladder utilizing adhesives or other suitable bonding means. For example, a thin membrane material such as Kynar PVDF film can be used to form the piezoelectric components. Piezoelectric fibers and fiber composites also could be used as the piezoelectric component. Such fibers are manufactured and sold by Advanced Cerametrics, Inc. of Lambertville, N.J. In the embodiment shown in FIG. 6, a piezoelectric elastomer could be utilized and built within the bladder. Alternatively, a piezoelectric member could be encapsulated by elastic material in order to create the integral bladder. Ceramic piezoelectric components could be utilized, for example, in conjunction with the embodiment of FIG. 7 or whenever a repetitive force is used with the piezoelectric component to achieve the piezoelectric effect. Any one of a number of energy harvesting electronics could be used to store and/or direct the generated electrical energy to the desired application.

It should be appreciated that the collection of energy by the source 26 is just one of the many uses of the fluid pulsating generator made in accordance with the present invention. In this regard, the source 26 could be a simple collection device which stores the energy for future use. The source could use, for example, the produced energy to regulate, through electronic pressure sensors and similar components, the device to which the fluid pulsating generator is associated. In this regard, if the fluid pulsating generator is associated with an irrigation sprinkler, the generated energy could be utilized regulate the flow fluid being expelled by the sprinkler. Additional uses include, but are not limited to, coupling the fluid pulsating generator to other devices such as soil moisture reading devices, water clarification devices or regulating micro devices that would use the generated electricity on a local level without the need for external batteries.

The fluid pulsating generator of the present invention can be incorporated into irrigation devices such as a sprinkler which can be used as a stand alone pulsator or can be added to an irrigation line directly as an online emitter. Alternatively, when used in an irrigation setting, the fluid pulsating generator/sprinkler could be placed on the inside of an irrigation tube as an inline emitter. In this regard, the present invention has many practical applications when used with fluid systems, such as irrigation systems. However, it should be appreciated the fluid pulsating generator of the present invention can be used with many other fluid device which generate a pulsating action from fluid flow. Also, while water is the most common fluid which can be used in accordance with the present invention, other fluids and devices could be used to generate the pulsating action.

Although the above-description of the present invention describes a particular configuration, the invention is not limited to that configuration. Other modifications and improvements may be made without departing from the spirit and scope of the present invention.

What is claimed is:

1. A fluid pulsating generator, comprising:
a fluid inlet;
an actuating mechanism associated with the fluid inlet, the actuating mechanism developing a repetitive motion in response to contact with fluid flowing through the fluid inlet;
a piezoelectric element associated with the actuating mechanism, the repetitive motion developed by the actuating mechanism creating a repetitive force which strikes the piezoelectric element to generate an electrical voltage; and
a housing for housing the fluid inlet and actuating mechanism, the piezoelectric element being attached to a portion of the housing with a portion of the actuating mechanism designed to repetitively strike the piezoelectric element to generate the electrical voltage.

2. The fluid pulsating generator of claim 1, further including an energy storage device associated with the piezoelectric element for storing the generated electrical voltage.

3. The fluid pulsating generator of claim 1, wherein the piezoelectric element is a ceramic piezoelectric element.

4. The fluid pulsating generator of claim 1, further including a plurality of piezoelectric elements associated with the actuating mechanism.

5. An irrigation pulsating generator, comprising:
a housing including a water inlet and a water outlet;
an inflatable bladder having an inlet portion for receiving water from the water inlet and an outlet portion for releasing stored up water, the inflatable bladder developing an intermittent and pulsating water flow there through which is ejected through the water outlet of the housing, the inflatable bladder being adapted to expand and contract when developing the intermittent and pulsating water flow there through; and
a piezoelectric element associated with the inflatable bladder, the expansion and contraction of the inflatable bladder deforming the piezoelectric element to generate an electrical voltage.

6. The irrigation pulsating generator of claim 5, further including an energy storage device associated with the piezoelectric element for storing the generated electrical voltage.

7. The irrigation pulsating generator of claim 5, wherein the piezoelectric element is attached to the inflatable bladder.

8. The irrigation pulsating generator of claim 5, wherein the piezoelectric element is formed into the wall of the inflatable bladder.

9. The irrigation pulsating generator of claim 5, wherein the piezoelectric element undergoes repetitive tensioning and non-tensioning in order to generate the electrical voltage.

10. The irrigation pulsating generator of claim 5, wherein the piezoelectric element undergoes repetitive contact with a structure to generate the electrical voltage.

11. The irrigation pulsating generator of claim 5, wherein the generator is adapted to be placed in an irrigation line used to supply water to a plurality of irrigation devices.

12. The irrigation pulsating generator of claim 5, further including a water dispersing component associated with the water outlet for dispersing water to an area surrounding the generator.

* * * * *